United States Patent [19]
Wang et al.

[11] Patent Number: 5,796,876
[45] Date of Patent: Aug. 18, 1998

US005796876A

[54] APPARATUS FOR READING IMAGE AND METHOD THEREFOR

[75] Inventors: Laiqiang Wang; Fujio Furuhata, both of Nagano, Japan

[73] Assignee: Seiko Epson Corporation, Tokyo, Japan

[21] Appl. No.: 544,814

[22] Filed: Oct. 18, 1995

[30] Foreign Application Priority Data

Dec. 20, 1994 [JP] Japan ................. 6-316986

[51] Int. Cl.⁶ ............................................... G06K 9/00
[52] U.S. Cl. ........................................ 382/270; 382/312
[58] Field of Search .................................. 382/312, 313, 382/315, 316, 317, 318, 319, 321, 322, 323, 324, 273, 270, 169, 172, 271, 272, 274, 275, 307, 308; 250/559.05, 234, 559.06, 559.36; 358/455, 464, 466, 465

[56] References Cited

U.S. PATENT DOCUMENTS

| | | | |
|---|---|---|---|
| 4,593,325 | 6/1986 | Kannapell et al. | 358/382 |
| 4,667,250 | 5/1987 | Murai | 358/283 |
| 4,709,274 | 11/1987 | Tanioka | 358/283 |
| 4,742,400 | 5/1988 | Tsuji | 358/284 |
| 5,073,958 | 12/1991 | Imme | 382/318 |
| 5,115,478 | 5/1992 | Sugiura | 382/50 |
| 5,214,294 | 5/1993 | Toyofuku | 250/561 |
| 5,313,533 | 5/1994 | Scott | 382/318 |

FOREIGN PATENT DOCUMENTS

| | | | |
|---|---|---|---|
| 0 581 971 A1 | 2/1994 | European Pat. Off. | H04N 1/40 |
| 58-29674 | 6/1983 | Japan | H04N 1/40 |
| 59-63884 | 4/1984 | Japan | H04N 1/40 |
| 4-213967 | 5/1992 | Japan | H04N 1/40 |

*Primary Examiner*—Leo H. Boudreau
*Assistant Examiner*—Bijan Tadayon
*Attorney, Agent, or Firm*—Morgan, Lewis & Bockius LLP

[57] ABSTRACT

An image to be read is divided into blocks, and pixels included in each block are consecutively binarized on the basis of a threshold. At this time, the threshold is determined in accordance with a maximum value of an image signal of an area including a block adjacent to an attention-focused pixel. If the threshold is smaller than a reference threshold which is determined in accordance with the maximum value of the image signal of a particular reference pixel of a preceding block, the area is changed, and the threshold is redetermined in accordance with the maximum value of the image signal of the new area.

17 Claims, 8 Drawing Sheets

FIG. 6

$$Th = \begin{cases} a; & \text{if } 0 \leq \text{MAXIMUM VALUE OF AREA} < m \\ b; & \text{if } m \leq \text{MAXIMUM VALUE OF AREA} < n \\ c; & \text{if } n \leq \text{MAXIMUM VALUE OF AREA} < p \\ d; & \text{if } p \leq \text{MAXIMUM VALUE OF AREA} < q \\ e; & \text{if } q \leq \text{MAXIMUM VALUE OF AREA} < r \\ f; & \text{if } r \leq \text{MAXIMUM VALUE OF AREA} \leq 255 \end{cases}$$

a-f, m, n, p, q AND r ARE ALL INTEGERS OF 0 TO 255

FIG. 7

$$Th = \begin{cases} a; \text{ if } 0 \leq \text{MAXIMUM VALUE OF AREA} < m \\ b; \text{ if } m \leq \text{MAXIMUM VALUE OF AREA} < n \\ c; \text{ if } n \leq \text{MAXIMUM VALUE OF AREA} < p \\ d; \text{ if } p \leq \text{MAXIMUM VALUE OF AREA} < q \\ e; \text{ if } q \leq \text{MAXIMUM VALUE OF AREA} < r \\ f; \text{ if } q \leq \text{MAXIMUM VALUE OF AREA} < r \text{ AND } 0 \leq \text{MINIMUM VALUE OF AREA} < x \\ g; \text{ if } q \leq \text{MAXIMUM VALUE OF AREA} < r \text{ AND } x \leq \text{MINIMUM VALUE OF AREA} \leq 255 \\ h; \text{ if } r \leq \text{MAXIMUM VALUE OF AREA} < s \text{ AND } 0 \leq \text{MINIMUM VALUE OF AREA} < x \\ i; \text{ if } r \leq \text{MAXIMUM VALUE OF AREA} < s \text{ AND } x \leq \text{MINIMUM VALUE OF AREA} \leq 255 \\ j; \text{ if } s \leq \text{MAXIMUM VALUE OF AREA} \leq 255 \text{ AND } 0 \leq \text{MINIMUM VALUE OF AREA} < x \\ k; \text{ if } s \leq \text{MAXIMUM VALUE OF AREA} \leq 255 \text{ AND } x \leq \text{MINIMUM VALUE OF AREA} \leq 255 \end{cases}$$

ALL THE LETTERS OF THE ALPHABET ARE INTEGERS OF 0 TO 255

FIG. 8(a) ORIGINAL IMAGE
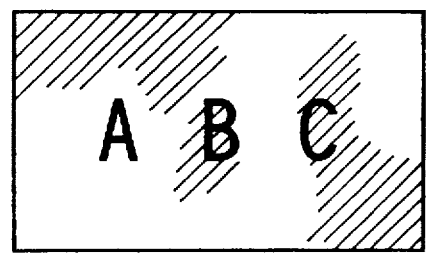
FIG. 8(b) CONVENTIONAL EXAMPLE 1
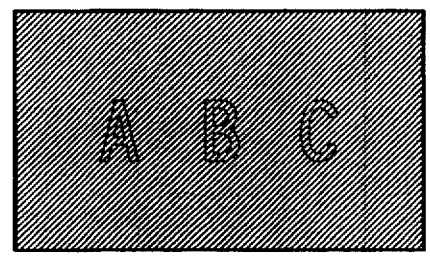
FIG. 8(c) CONVENTIONAL EXAMPLE 2
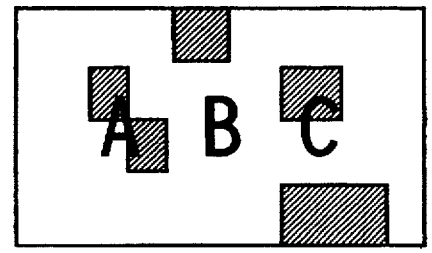
FIG. 8(d) PRESENT INVENTION
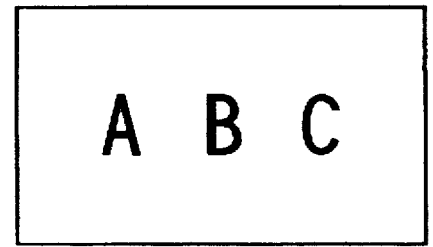

APPARATUS FOR READING IMAGE AND METHOD THEREFOR

BACKGROUND OF THE INVENTION

1. Field of the Invention

The present invention relates to a technique for binarizing light-quantity signals outputted from an image reading apparatus such as an image scanner, facsimile equipment, a copying machine, and the like. More particularly, the present invention concerns a technique for accurately reading information such as characters and line drawings from an image originally recorded at various density levels.

2. Description of Related Art

Conventionally known techniques of this field include, among others, a method disclosed in Japanese Patent Publication No. 58-29674 in which a point of intersection between a single threshold and a curve obtained by continuously connecting the values read is set as a changing point, and the single threshold is determined such that the changing points become most numerous, and a method disclosed in Japanese Patent Application Laid-Open No. 59-63884 in which image information of an original is received in a first scanning, and an image signal having the highest frequency of appearance is added to an original basic threshold so as to set a corrected threshold, thereby effecting binarization.

With these methods, however, since the threshold is always fixed with respect to the entire region of the image to be read, in the case of a image in which characters or the like are added on a shaded background such as a photograph, there is a drawback in that it is difficult to effect an accurate reading. Accordingly, to overcome such a problem in the invention disclosed in Japanese Patent Application Laid-Open No. 4-213967, the object image is divided into blocks, a histogram is obtained for each block, and an attempt is made to overcome the above-described problem by determining a threshold on the basis of the distribution of the histogram.

In the above-described invention, however, if an attempt is made to read and binarize an image in which black characters are present in a shaded background as shown in FIG. 8(a), the result is either that, as shown in FIG. 8(b), all the pixels are binarized into one value, or that, as shown in FIG. 8(c), a number of processing units are wholly binarized into one value. Conceivably, this is due to the presence of a problem in the concept of obtaining density histograms and determining thresholds by using values having a high frequency of appearance of the image signal. In addition, this method of determining density histograms has drawbacks in that much memory is required, and that a long time is required in processing.

SUMMARY OF THE INVENTION

The present invention has been devised to overcome the above-described problems, and it is an object of the present invention to provide an image reading apparatus which is capable of selecting an optimum threshold for each small unit even in the case of a strict condition where the color of the information to be read in the image and the background color are similar in density, thereby making it possible to obtain binarized results of higher accuracy.

In accordance with the present invention, attention is focused consecutively on each pixel as an image is scanned, and an attention-focused block comprising pixels including this attention-focused pixel is defined. At the same time, at least one adjacent block comprising similar pixels is defined in the vicinity of the attention-focused block. Preferably, a plurality of adjacent blocks are defined so as to permit the accurate extraction of a characteristic of the background at the location of the image where the attention-focused block is located.

Next, the characteristic value of the image signal of the attention-focused block is calculated, and the characteristic value of the image signal of the adjacent block is calculated. The characteristic value is, for example, a maximum value, a minimum value, an intermediate value, or a combination thereof. Then, as the characteristic value of the attention-focused block and the characteristic value of the adjacent block are referred to, a threshold for binarizing the attention-focused pixel is determined.

Thus, the threshold for binarizing the attention-focused pixel is determined by taking into consideration not only the characteristic value of the block including the attention-focused pixel but also the characteristic value of an adjacent block. For that reason, as compared with a conventional technique in which the threshold is determined only on the basis of a local image signal in an attention-focused block, the characteristic of the image in the background can be extracted more accurately, thereby making it possible to determine the threshold appropriately.

In addition, in the present invention, since the threshold is calculated by using characteristic values such as a maximum value and a minimum value, the contents of processing can be simplified as compared with the conventional method using histograms.

In a preferred embodiment, two areas provided with portions which do not overlap with each other are defined in the vicinity of the attention-focused block. For example, the first area comprises the attention-focused block and a number of blocks adjacent thereto. In contrast, the second area includes the attention-focused block and a number of adjacent blocks arrayed continuously from the attention-focused block in the main-scanning direction. The characteristic value of the image signal is calculated for each individual area, and the threshold for binarizing the attention-focused pixel is determined on the basis of the characteristic values of these two areas.

In this preferred embodiment, the binarization threshold is basically determined on the basis of the characteristic value of the first area. However, if the characteristic value of the first area is not appropriate, the threshold is supplementally determined on the basis of the characteristic value of the second area. Here, the case where there is a possibility that the characteristic value of the first area is not appropriate is, for instance, the case where the threshold calculated on the basis of the characteristic value of the first area is greater than the binarization threshold of an already-scanned adjacent pixel. In such a case, since there is a possibility that the characteristic value of the first area is affected by local noise (e.g., the first area is filled with characters or the like), the characteristic value of the second area is used instead.

In order to use the characteristic values of the first area and the second area selectively or in combination for the determination of the threshold, it is essential that the first area and the second area are selected such that they both have a direct relationship with the attention-focused pixel, have portions which do not overlap with each other, and are not affected by the same local noise. In the preferred embodiment, the first and second areas are selected in the above-described form so that these conditions are met satisfactorily. Namely, the first area comprises the attention-focused block and a number of blocks adjacent thereto, while the second area comprises the attention-focused block and a number of adjacent blocks arranged continuously from the attention-focused block in the main-scanning direction.

In particular, if a plurality of blocks arrayed on a line extending from the attention-focused block in the main-scanning direction are set as the second area, not only a character portion but also a background portion are always included in the second area. Consequently, it is possible to improve the threshold accuracy at the time of binarization. In addition, if the size of the first area is increased to include a large number of blocks, it is possible to cope with large characters.

In addition, in another preferred embodiment, in the process of raster scanning an image in the main-scanning direction and in the sub-scanning direction, the attention-focused block and the adjacent blocks are defined with respect to only the portion of the image for which scanning has been completed, and the threshold of the attention-focused pixel is determined to effect binarization. For this reason, since a bit image of the image can be obtained by performing binarization by following the read-scanning of the image in real time, as compared with the conventional method in which a histogram of a block is determined to effect binarization, the processing time can be shortened remarkably, and processing is possible to less memory. Further, it is possible to binarize and extract with high accuracy only the necessary information from a plurality of pieces of data having image signals of very close numerical values, which is considered very difficult in accordance with the histogram method.

In accordance with the present invention, highly accurate reading is possible as compared with the conventional techniques particularly in a case where the background is not white but colored or has irregularities in light and shade, and in a case where the background has gradations in which the relative density increases or decreases.

In addition, if the present invention is used for optical character recognition (OCR), characters can be recognized with high accuracy even in the case where the background is not white but colored, or has irregularities in shade.

Furthermore, by using not only a maximum value but also a minimum value as the characteristic value, it is possible to recognize characters with high accuracy with respect to a light-color original whose image signal is high, i.e., whose reflectance is high.

BRIEF DESCRIPTION OF THE DRAWINGS

FIG. 6 is a diagram illustrating a LUT for determining a threshold from a maximum value of an area in the embodiment of the present invention;

FIG. 7 is a diagram illustrating a LUT for determining a threshold from a maximum value and a minimum value of an area in the embodiment of the present invention;

FIG. 8(a) is an example of an original image;

FIG. 8(b) to 8(d) are illustrating the results of implementation of a conventional method and the method of the present invention with respect to the original image FIG. 8(a)

DETAILED DESCRIPTION OF THE PREFERRED EMBODIMENTS

First Embodiment

Figure 1:
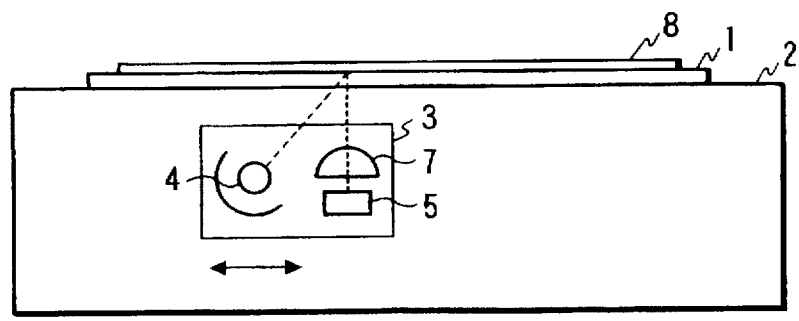
FIG. 1 is a diagram illustrating a schematic structure of a flatbed-type image reading apparatus.

FIG. 1 shows a schematic structure of an embodiment of a flatbed-type image reading apparatus in accordance with the present invention.

An original table 1 constituted by a transparent plate such as flat glass is provided on an upper surface of a box-shaped casing 2. Provided in the casing 2 is a carriage 3 which moves in parallel with the original table 1 by means of a driving device (not shown), and a light source 4 and a line sensor 5 are mounted on the carriage 3. Output light from the light source 4 is reflected by the surface of an original 8 on the original table 1, and is focused onto the line sensor 5 by means of a focusing lens 7. Incidentally, a charge-storage type photo sensor such as a CCD is used as the line sensor 5.

Figure 2:
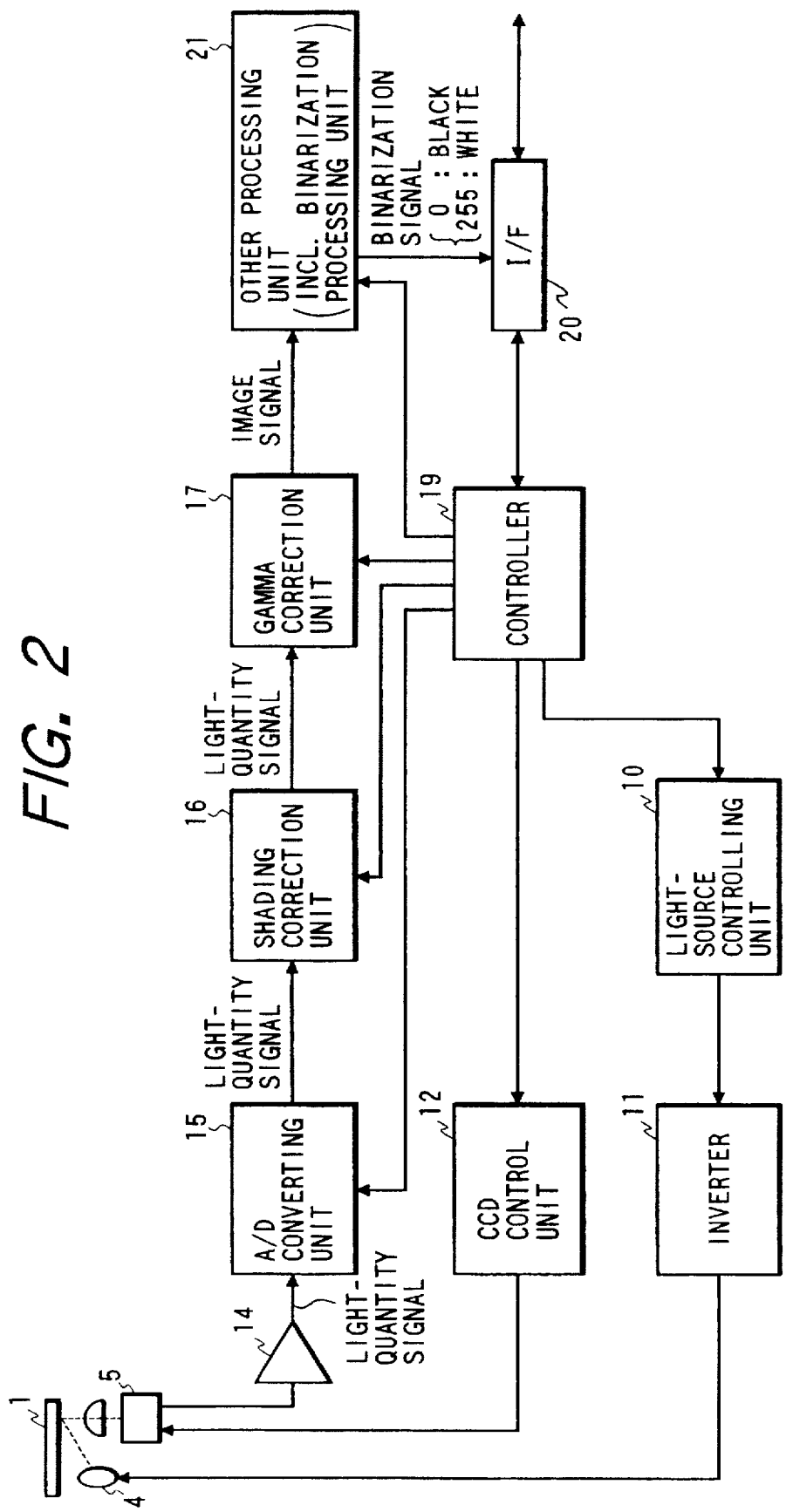
FIG. 2 is a block diagram illustrating a configuration of the functions of a light-source controlling and sensor-signal processing device in accordance with the embodiment.

FIG. 2 shows a configuration of the function of a light-source controlling and sensor-signal processing device in the image reading apparatus having the above-described structure.

In FIG. 2, a light-source controlling unit 10 controls the lighting time of the light source 4 by being controlled by a controller 19 which will be described later. A control signal from the light-source controlling unit 10 is outputted to an inverter 11, and lights the light source 4 for a selected time. A CCD control unit 12 generates a shift pulse in correspondence with the lighting timing of the light source 4, and controls the reading by the line sensor 5 in correspondence with the scanning speed of the carriage 3. An A/D converting unit 15 converts a light-quantity signal from the line sensor 5 inputted via an amplifier 14 into a digital signal, and delivers the same to a shading correlation unit 16. The shading correction unit 16 corrects variations in the sensitivity for each photoelectric device included in the light-quantity signal from the line sensor 5. A gamma correction unit 17 converts the light-quantity signal corrected by the shading correction unit 16 into an image signal by using gamma functions. Here, the image signal is 0 in the case of an ideal black, and assumes a value of 255 in the case of an ideal white. The controller 19 is consists of a microcomputer comprising a CPU, a RAM, a ROM, and the like, is connected to an external image processor such as a personal computer via an interface 20, and controls the lighting time of the light source 4 and selects gamma functions in response to command signals from the personal computer. Reference numeral 21 denotes another processing unit for effectuating various transformations, including color correction, edge enhancement, area enlargement/reduction, and the like with respect to the aforementioned image signals. The binarization processing which is the characteristic feature of the present invention is also effectuated by the processing unit 21.

Next, a description will be given of the operation of the apparatus configured as described above.

The user connects a personal computer (not shown) to the interface 20 of the image reading apparatus, places the original 8 on the original table 1, and instructs the execution of reading from the personal computer. Upon issuance of a command for reading, the controller 19 causes the light source 4 to light up at each read-line position while consecutively moving the carriage 3 toward each read-line position. Consequently, a charge of an amount proportional to the reflectance of the original 8 is stored in the line sensor 5 at each read-line position. When the lighting time has elapsed at each read-line position, the controller 19 outputs a shift pulse to the CCD control unit 12 to thereby cause the charge stored in the line sensor 5 to be consecutively outputted to the amplifier 14, and at the same time moves the carriage 3 at a predetermined speed to a sub-scanning line subject to an ensuing reading. An output signal V from the line sensor 5 is amplified by the amplifier 14, is then converted into a digital signal by the analog/digital converting unit 15 and is outputted to the shading correction unit 16, and is then sent to the gamma correction unit 17 where the signal is converted into an image signal I by gamma functions. This image signal I is binarized by the other processing unit 21, and is finally outputted to the personal computer or displayed on a display via the interface 20.

Figure 3:
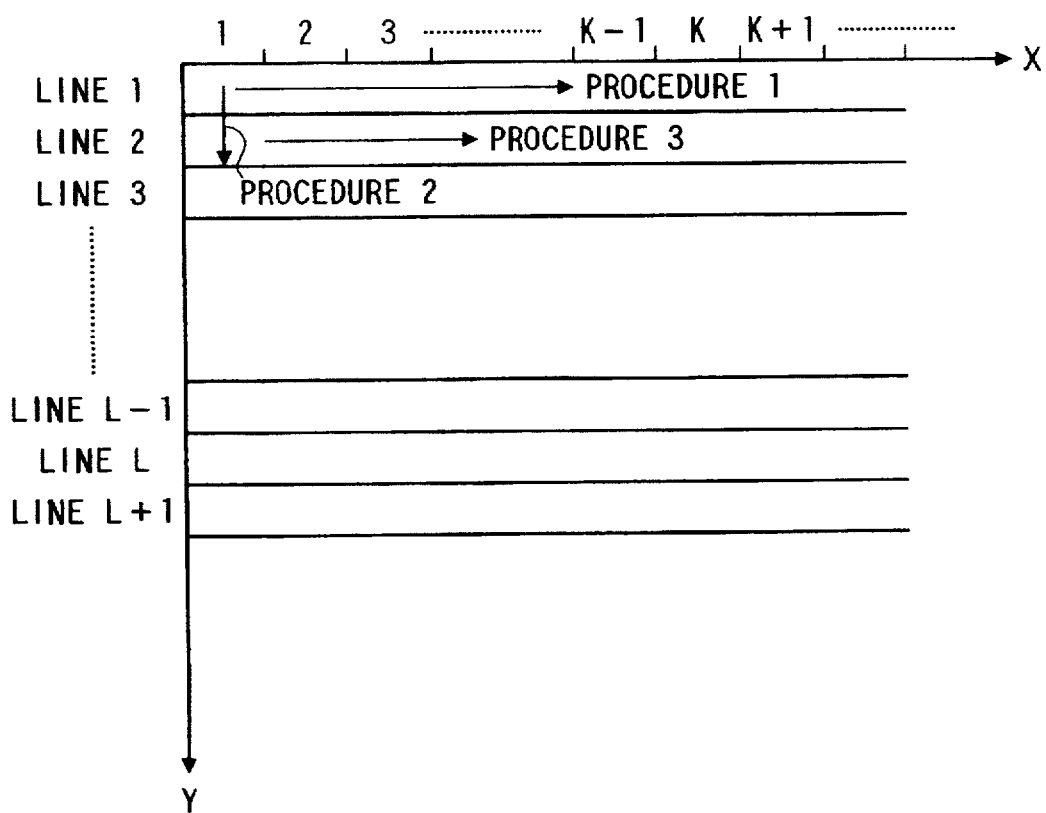
FIG. 3 is a diagram schematically illustrating a series of image reading operation in the image reading apparatus in accordance with the present invention.

This series of reading operation is schematically shown in FIG. 3. Using the corner of the image at upper left as an origin, processing is carried out by consecutively reading blocks in the first line from the left in the main-scanning direction according to procedure 1, and binarized results are outputted. When the processing is completed up to the block including the image end at the right, the operation proceeds to the reading operation of an ensuing line located one line below according to procedure 2, and processing is effected again from the left-end block to the right-end block, and binarized results are outputted. As this process is repeated, the reading of all the portions of an object image is finally completed.

In this first embodiment, one block constituting a unit of processing is comprised of 16 pixels in the main-scanning direction, and one pixel in the sub-scanning direction. Depending on cases, however, it is possible to provide an arrangement in which image signals of a plurality of lines are stored in advance, blocks each having a size of N×M pixels are generated, and processing is carried out consecutively. In addition, although, in this embodiment, it is assumed that a first area to be referred to has 2×2 blocks, and a second area has 4×1 blocks, the sizes of these area may be changed freely. Further, the method for determining a threshold shall be a method on a lookup table.

Figure 4:
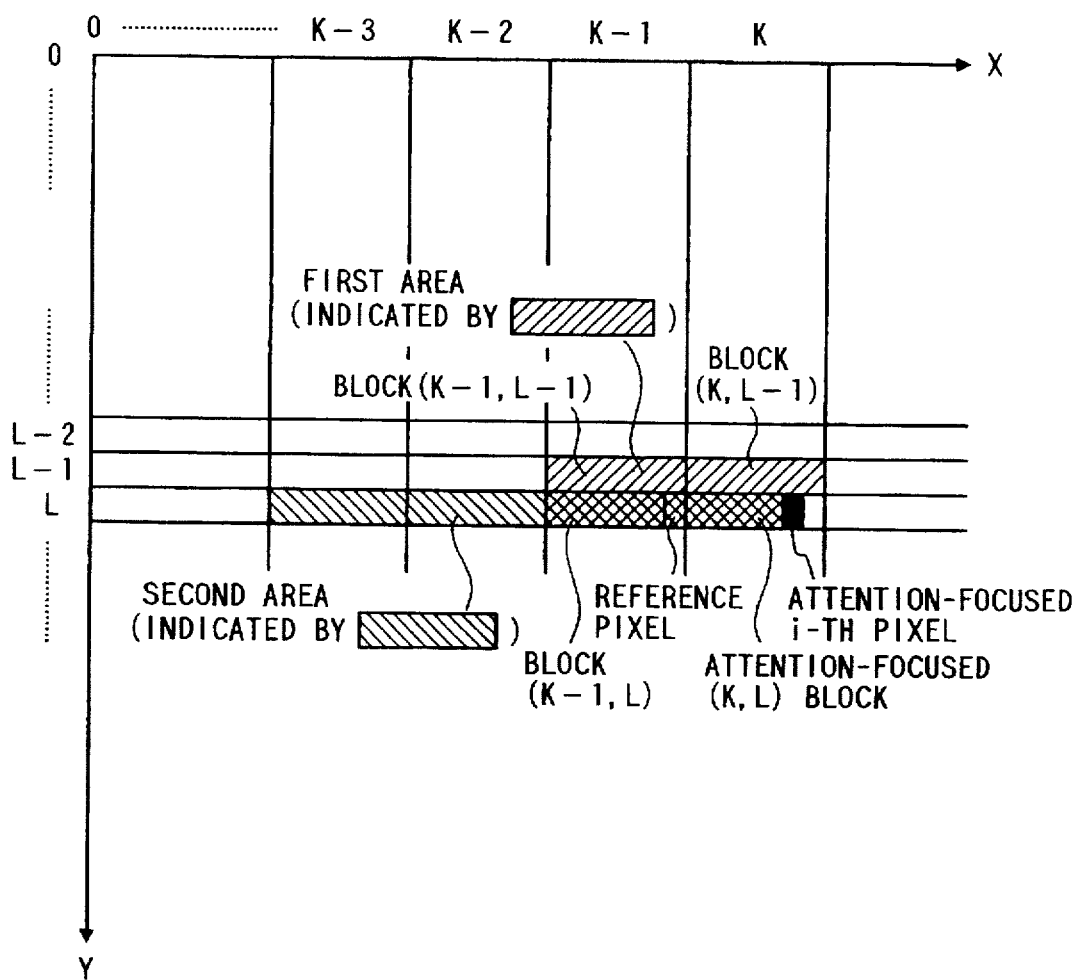
FIG. 4 is a diagram illustrating the form of processing an object image for explaining a first embodiment.

The form of processing an object image for explaining this embodiment is shown in FIG. 4. In the case of this drawing, the main-scanning direction is set as X, the sub-scanning direction is set as Y, and the origin for a processing start is set as the upper left end. First, the light source 4 of the carriage 3 is made to emit light on the line 0, and light-quantity signals are obtained by the line sensor 5. Next, starting from the left-hand side, these light-quantity signals are divided into blocks (0, 0), (1, 0), (2, 0), . . . each having 16 pixels, and the binarization processing of the respective blocks is performed consecutively. Then the operation moves in the sub-scanning direction by one line, and the binarization processing is similarly performed in the order of blocks (0, 1), (1, 1), (2, 1), . . . in the main-scanning direction. It is now assumed that the block subject to processing has thus arrived at (K, L) (where K and L are integers greater than or equal to 0).

In each block, the respective image signals of 16 pixels (however, not necessarily 16 pixels at the rightmost image and) arranged in a horizontal row are consecutively binarized form left to right. In this drawing, the object pixel to which attention is focused is an i-th pixel (i is an integer greater than end equal to 0 and equal to and less than 15) in the block (K, L) to which attention is being focused. When the binarization of the i-th pixel to which attention is focused is completed, the operation proceeds to the processing of an adjacent ensuing (i+1)th pixel on the right, and the binarization processing is performed in the same way as the preceding i-th pixel.

Figure 5:
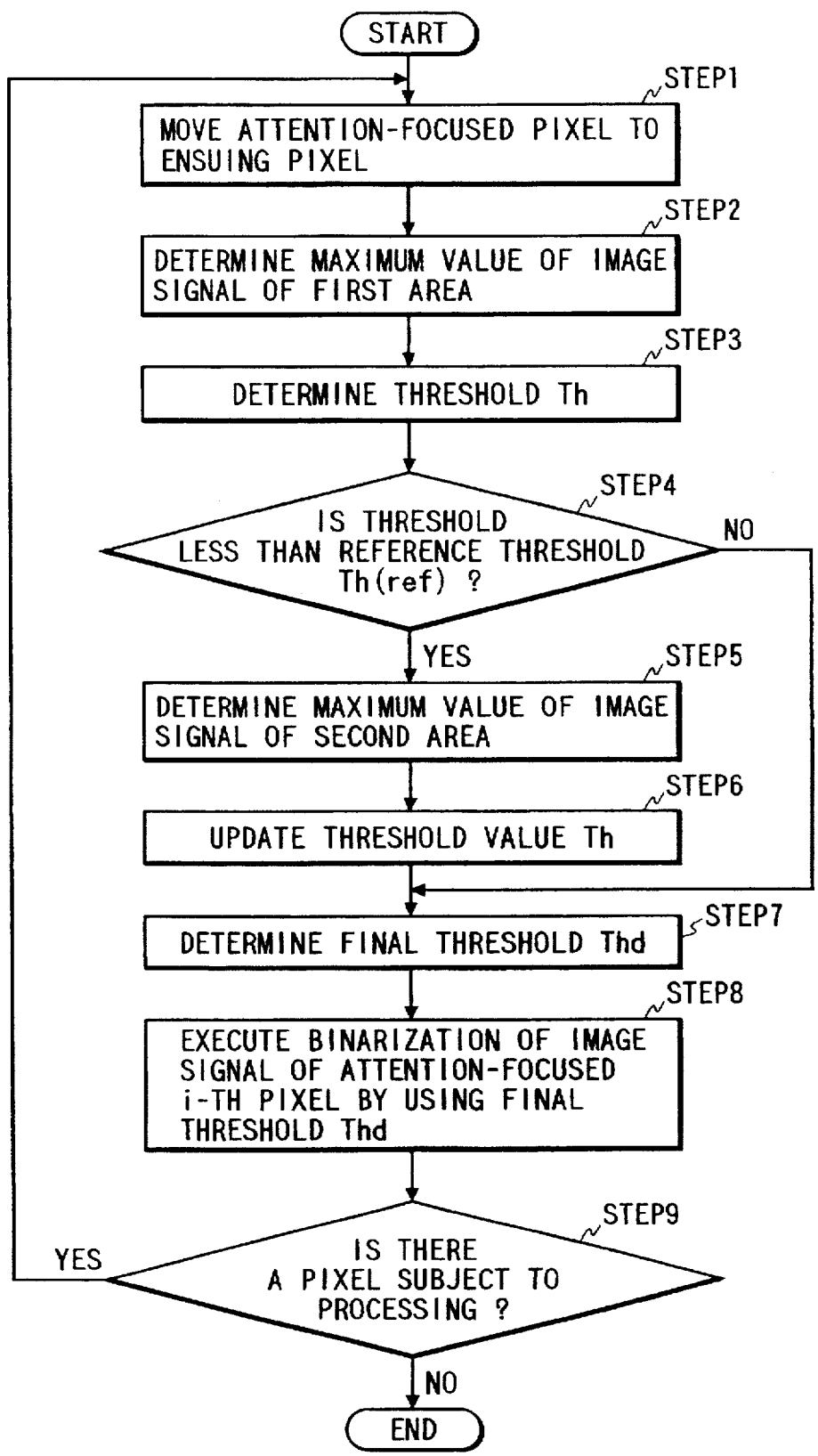
FIG. 5 is a flow chart illustrating the basic flow of the embodiment of the present invention.
Figure 9:
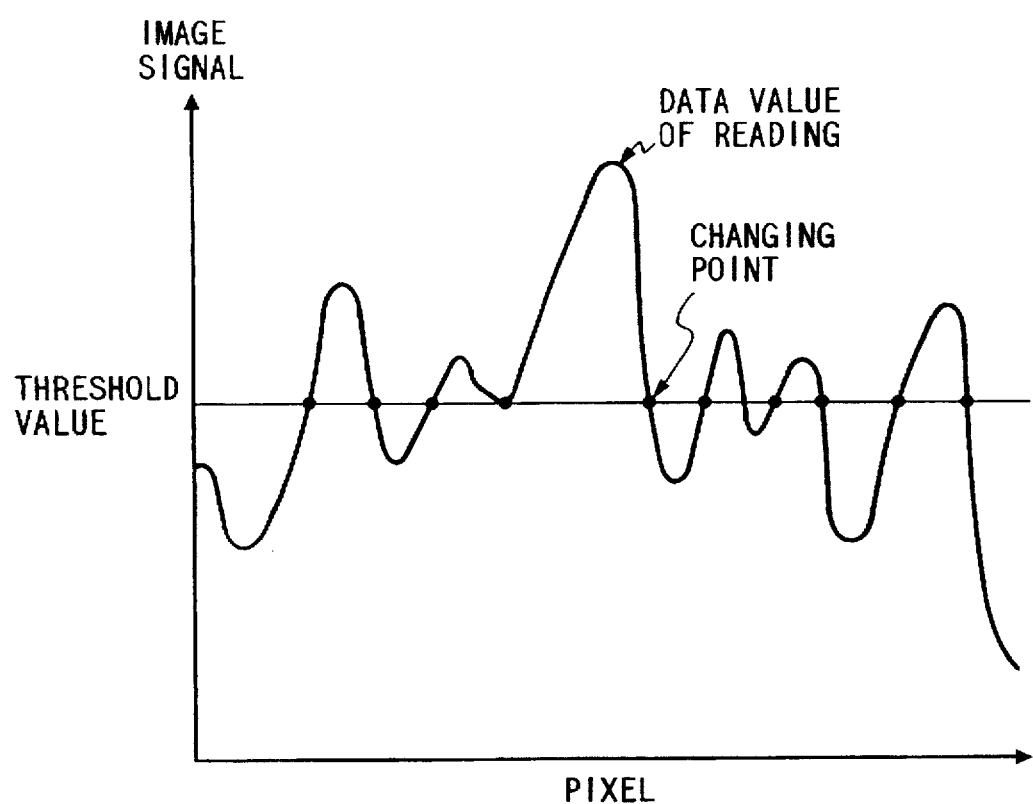
FIG. 9 is a diagram explaining a conventional technique.

The binarization processing of the i-th pixel to which attention is focused is carried out in accordance with the flow shown in FIG. 5. Hereafter, a detailed description will be given of the flow in FIG. 5.

First, after the binarization processing of the (i−1)th pixel is finished, the object of processing is moved to the i-th pixel (Step 1).

Next, three reference blocks (K−1, L−1), K, L−1), and (K−1, L) and a portion of the attention-focused block (K, L) up to the attention-focused pixel, which are subject to control, are set as a first area. Maximum values are respectively determined for the four blocks, and a maximum value of the first area is determined from the four maximum values (Step 2). Here, the maximum value means a value of the image signal closest to white in the block Since all the image signals in the reference blocks (K−1, L−1), (K, L−1), and (K−1, L) are already known, the maximum values of the blocks are fixed. With respect to the attention-focused block (K, L), the maximum value can move as the attention-focused i-th pixel moves. However, when K is 0, the block (K, L−1) and the attention-focused block (K, L) are set as the first area; when L is 0, the block (K−1, L) and the attention-focused block (K, L) are set as the first area; and when both K and L are 0, only the attention-focused block (K, L) is set as the first area.

Next, a threshold Th is determined on the basis of a lookup table (hereafter referred to as the LUT) shown in FIG. 6. In this LUT, the smaller the maximum value of the first area (generally, an image in which the background of the area is close to black), the threshold is set to a value closer to the black value (a value closer to 0), whereas the greater the maximum value (generally, an image in which the background of the area is close to white), the threshold is set to a value closer to the white value (a value closer to 255). Here the larger the number of values stored representing different cases of the threshold, with respect to a maximum value, are classified into, the more the accuracy of binarization naturally improves, but the memory capacity of the LUT increases. In this LUT, boundary values for classifying the maximum value are multiples of 16 which facilitate the handling by the computer. Incidentally, instead of the LUT, it is possible to determine the threshold by a function of:

$$Th = f (\text{maximum value})$$

Next, in Step 4, a comparison is made between this threshold Th and the threshold (hereafter referred to as the reference threshold Th(ref)) of a final pixel (hereafter referred to as the reference pixel) in the preceding block (K—1, L). If Th is smaller, the operation proceeds to Step 5. If Th(ref) is less than or equal to Th, the operation jumps to Step 7. This measure is provided to ensure that an appropriate threshold is selected in correspondence with a location in the case of an original in which the tone of the background is not uniform and differs in some locations. Incidentally, the reference threshold need not necessarily be the threshold of a final pixel of the preceding block (K−1, L), and may be another value, e.g., a maximum value of an image signal extracted from all the pixels of the preceding block. In addition, in the case of a block (0, L) which has no preceding block on the left, the reference threshold Th(ref) may be, for instance, a default value (e.g., 128), or a value determined from an immediately preceding sub-scanning line.

In a case where Th is less than Th(ref), other three reference blocks (K−3, L), (K−2, L) and (K−1, L) and a portion of the attention-focused block (K, L) up to the attention-focused pixel are set as a second area. Maximum values are respectively determined for the four blocks, and a maximum value of the second area is determined from the four maximum values (Step 5). Since all the image signals are already known with respect to the reference blocks (K−3, L), (K−2, L) and (K−1, L), the maximum values of the blocks are fixed. With respect to the attention-focused block (K, L), the maximum value can move as the attention-focused i-th pixel moves. However, when K is 0, only the attention-focused block (k, L) is set as the second area; when K is 1, the block (K−1, L) and the attention-focused block (K, L) are set as the second area; and when K is 2, the blocks (K−2, L) and (K−1, L) and the attention-focused block (K, L) are set as the second area. Thus, a maximum value for the second area is determined in a method similar to the one used for determining the maximum value for the first area. Incidentally, although the first area is determined in such a manner as to be provided with a plurality of blocks both in the main-scanning direction and in the sub-scanning direction, while the second area is determined in such a manner as to be provided with a plurality of blocks in the main-scanning line containing the attention-focused block. However, the method of determining the first and second areas is not confined to the same. In addition, as for the sizes of the first and second areas, the larger the size of the character to be read, the size of the area should be made the larger. In this embodiment, the sizes of the aforementioned two areas are determined on the assumption that characters having a size ranging from, for instance, several square millimeters to tens of square millimeters or thereabouts are read.

Next, in the same way as in Step 3, the threshold is determined on the basis of the maximum value of the second area thus determined (Step 6). The table used at this time is the one shown in FIG. 6 used in Step 3, but a different table may of course be prepared. Alternatively, instead of the table, it is possible to use the function:

$$Th = f \text{ (maximum value)}$$

Next, if, in Step 4, Th(ref) is less than or equal to Th, the threshold Th obtained at that time is determined as a final threshold Thd; meanwhile, if Th is less than Th(ref), the threshold Th obtained in the preceding Step 6 is determined as the final threshold Thd (Step 7). However, if Th is equal to Th(ref), the operation may go through Steps 5 and 6.

The binarization of the image signal of the attention-focused i-th pixel is effected by using this final threshold Thd (Step 8). Incidentally, in the binarization in this embodiment, if the image signal of the attention-focused i-th pixel is greater than the final threshold Thd, the value 1 is used, and if it is smaller, the value 0 is used.

Further, if there remains an unprocessed pixel adjacent to the attention-focused i-th pixel on the right, the attention-focused pixel is moved to this adjacent pixel, and Steps 1 through 8 are repeated again. Meanwhile, if there is no unprocessed adjacent pixel on the right, the read processing of an ensuing sub-scanning line is started. If the sub-scanning line is not subject to processing (if there is no image signal), this binarization processing ends (Step 9).

In the above-described manner, in the reading of the image, the binarization is performed with respect to each pixel for each sub-scanning line, and when that processing is finished, the operation proceeds to an ensuing sub-scanning line to effect processing.

By virtue of such processing, for example, a result such as the one shown in FIG. 8(d) is obtained for an image shown in FIG. 8(a). This shows that the processed result is affected by the light and shade of the background, and that the subject information is read very clearly with high accuracy.

Second Embodiment

In the first embodiment, thresholds are consecutively set with respect to the individual pixels in the attention-focused block. In this second embodiment, however, by referring to all the pixels in an initial attention-focused block, their maximum value is determined, and a maximum value of the first area is determined from four maximum values obtained by adding maximum values of the three reference blocks of the maximum value of the initial attention-focused block. Thereafter, processing is carried out in accordance with the flow starting with Step 3 shown in FIG. 5. In that case, the reference threshold in Step 4 can be set to be a value which is determined by the LUT from a maximum value among the values of all the pixels in the preceding block. In addition, as for the maximum value of the second area in Step 5, by first referring to all the pixels in the attention-focused block, their maximum value is determined, the maximum value of the second area is determined from among the four maximum values obtained by adding maximum values of the three reference blocks to the maximum value of the attention-focused block. Then, in Step 8, the individual pixels in the attention-focused block are not consecutively binarized, but when the final threshold with respect to the entire attention-focused block has been determined as described above, all the pixels in the block are binarized in a stroke. The binarized image obtained as a result is close to that of the first embodiment.

Third Embodiment

In this third embodiment, an intermediate value or a minimum value is used instead of the maximum value of each block. The intermediate value means, for instance, a value obtained by adding together the maximum value and the minimum value of image signals in each block and dividing the same by 2. The fact that the intermediate value or the minimum value is used means that the characteristic signal of the image which is taken into consideration in determining the threshold is taken from not a white portion but a halftone between white and black, or a black portion.

In addition, in the LUT for determining a threshold, the threshold is set in correspondence with an intermediate value or a minimum value.

In accordance with this embodiment, in terms of the reading accuracy in the case where an intermediate value was used, the obtained result was generally close to that in the case where a maximum value was used. In the case where a minimum value was used, however, the obtained result was liable to be inferior thereto.

Fourth Embodiment

In this fourth embodiment, both a maximum value and a minimum value of each block is referred to in order to increase the accuracy of binarization.

In this embodiment, when a maximum value of the first area is determined in Step 2 shown in FIG. 5, a minimum value of the first area is also determined at the same time. The method of determination is similar to that in the case of the maximum value. Then, a table which takes into consideration both maximum values and minimum values, as shown in FIG. 7, is used in determining the threshold in Step 3 or 6.

In the LUT shown in FIG. 7, in a case where the maximum value of the area of the image signal is small, i.e., when the background of the subject area is close to black, the threshold is determined by using only the maximum value as a parameter. Meanwhile, when the maximum value of the area is large, i.e., when the background of the subject area is close to white, the threshold is determined by taking into consideration both the maximum value and the minimum value. It is, of course, possible to use various other LUTs.

In accordance with this embodiment, with respect to an ordinary image having, for instance, black characters in a white background, the result is not much different from the result of the first embodiment. However, the reading accuracy can be expected to improve in the case of an image having white characters or colored characters in a black background.

As is apparent from the foregoing four embodiments, in the present invention, the image subject to reading is divided into mesh-like blocks, and the threshold for binarizing the individual pixels in these blocks is determined while referring to a characteristic value of an adjacent block (typically, a maximum value of the image signal). Accordingly, the binarization processing of the pixel to which attention is being focused can be executed while taking into consideration information on light and shade in its vicinity. Consequently, the object image can be read with high accuracy.

In addition, in the case where the lookup table is used as the method of determining the threshold, if the cases of the threshold are classified into a greater number of values, the recognition accuracy can be improved. In that case, it goes without saying that the calculation efficiency can be improved if the dividing numerical value for the classification of the cases is set to be a multiple of 8 or 16.

While the preferred embodiments of the present invention have been described, the present invention should not be confined to these embodiments, and can be implemented in various other forms without departing from its gist. For instance, the present invention can also be implemented in a copying machine, a facsimile communication system, or a system combining a computer and a scanner.

What is claimed is:

1. An image reading apparatus for reading an image signal of each pixel of an image and binarizing the image signal of each pixel by using a threshold, the image reading apparatus comprising:

scanning means for scanning the image while consecutively focusing attention to each pixel;

attention-focused-block defining means for defining an attention-focused block as a set of pixels including a pixel to which attention is focused;

adjacent-block defining means for defining at least one adjacent block as a set of pixels located in a vicinity of said attention-focused block;

characteristic-value calculating means for determining a characteristic value of the image signal of said attention-focused block and a characteristic value of the image signal of said adjacent block;

threshold determining means for determining the threshold to binarize the pixel to which attention is focused, said threshold determined by utilizing said characteristic value of said attention-focused block and said characteristic value of said adjacent block, said threshold determining means comprising:

first-area defining means for defining a first area so as to include at least one adjacent block offset from the attention-focused block in a first direction and said attention-focused block;

second-area defining means for defining a second area so as to include at least one adjacent block located outside said first area and offset from said attention-focused block in a second direction orthogonal to said first direction;

first-characteristic-value calculating means for calculating a first characteristic value on the basis of the image signal in said first area;

second-characteristic-value calculating means for calculating a second characteristic value on the basis of the image signal in said second area; and threshold calculating means for calculating said threshold by referring to said first characteristic value and said second characteristic value.

2. An image reading apparatus according to claim 1, wherein the characteristic value is at least one kind of value selected from a maximum value, a minimum value, and an intermediate value of the image signal.

3. An image reading apparatus according to claim 1, wherein said adjacent-block defining means defines in a vicinity of said attention-focused block a plurality of adjacent blocks each as a set of pixels.

4. A method of reading an image for reading an image signal of each pixel of an image and binarizing the image signal of each pixel by using a threshold, the method comprising the steps of:

scanning the image while consecutively focusing attention to each pixel;

defining an attention-focused block as a set of pixels including a pixel to which attention is focused;

defining at least one adjacent block as a set of pixels located in a vicinity of said attention-focused block;

determining a characteristic value of the image signal of said attention-focused block and a characteristic value of the image signal of said adjacent block;

determining the threshold so as to binarize the pixel to which attention is focused, the threshold determined by utilizing said characteristic value of said attention-focused block and said characteristic value of said adjacent block, said threshold-determining step comprising the steps of:

defining a first area so as to include at least one adjacent block offset from said attention-focused block in a first direction and said attention-focused block;

defining a second area so as to include at least one adjacent block located outside said first area and offset in a second direction, orthogonal to said first direction, from said attention-focused block;

calculating a first characteristic value on the basis of the image signal in said first area;

calculating a second characteristic value on the basis of the image signal in said second area; and calculating said threshold by referring to said first characteristic value and said second characteristic value.

5. An image reading apparatus according to claim 1, wherein said first area includes at least one adjacent block located adjacent to said attention-focused pixel, and said second area includes a plurality of adjacent blocks arrayed continuously from said attention-focused pixel in a fixed direction.

6. An image reading apparatus according to claim 1, wherein said threshold calculating means selectively refers to at least one of said first characteristic value and said second characteristic value.

7. An image reading apparatus according to claim 1, wherein said threshold calculating means basically refers to said first characteristic value and supplementally refers to said second characteristic value.

8. An image reading apparatus for reading an image signal of each pixel of an image and binarizing the image signal of each pixel by using a threshold, said image reading apparatus comprising:

scanning means for scanning the image in a main-scanning direction and in a sub-scanning direction while consecutively focusing attention to each pixel;

means for dividing the image into blocks each as a set of pixels of a predetermined size, and for defining an attention-focused block including a pixel to which attention is being focused;

first-area defining means for defining in a scanned region of the image a first area including said attention-focused block and a block adjacent to said attention-focused block in a first direction;

second-area defining means for defining in said scanned region a second area including an adjacent block offset in a second direction, orthogonal to said first direction, from the attention-focused block and located outside said first area; first-characteristic-value determining means for determining a first characteristic value on the basis of the image signal in said first area;

second-characteristic-value determining means for determining a second characteristic value on the basis of the image signal in said second area; and threshold determining means for determining said threshold for binarizing said attention-focused pixel, said threshold determined by utilizing said first characteristic value and said second characteristic value.

9. An image reading apparatus according to claim 8, wherein said first characteristic value is at least one kind of value selected from a maximum value, a minimum value, and an intermediate value of the image signal in said first area, and said second characteristic value is at least one kind of value selected from a maximum value, a minimum value, and an intermediate value of the image signal in said second area.

10. An image reading apparatus according to claim 8, wherein said threshold determining means comprises:

means for calculating a first threshold on the basis of said first characteristic value;

checking means for checking whether or not said first threshold is appropriate;

means for adopting said first threshold as a final threshold used for binarizing said attention-focused pixel when a result of the check is appropriate; and means for calculating said final threshold used for binarizing said attention-focused pixel when a result of the check is not appropriate.

11. An image reading apparatus according to claim 10, wherein said checking means comprises:

means for determining a reference threshold on the basis of an already-determined threshold with respect to an already-scanned pixel; and means for determining whether or not said first threshold is appropriate, by making a comparison between said first threshold and said reference threshold.

12. An image reading apparatus according to claim 8, wherein said first characteristic value is a maximum value and a minimum value of the image signal of said first area, and said threshold determining means refers to only the maximum value between the maximum value and the minimum value if the maximum value is relatively large, and refers to both the maximum value and the minimum value if the maximum value is relatively small.

13. An image reading apparatus according to claim 8, wherein each of said blocks comprising a plurality of pixels arrayed continuously in the main-scanning direction.

14. An image reading apparatus according to claim 8, wherein said first area includes said attention-focused block and blocks adjacent to said attention-focused block in the main-scanning direction and in the sub-scanning direction, sand said second area includes said attention-focused block and blocks arrayed continuously from said attention-focused block in the main-scanning direction.

15. A method of reading an image for reading an image signal of each pixel of an image and binarizing the image signal of each pixel by using a threshold, said method comprising the steps of:

scanning the image in a main-scanning direction and in a sub-scanning direction while consecutively focusing attention to each pixel;

dividing the image into blocks each as a set of pixels of a predetermined size, and for defining an attention-focused block including a pixel to which attention is being focused;

defining in a scanned region of the image a first area including the attention-focused block and a block adjacent to said attention-focused block in a first direction;

defining in said scanned region a second area including an adjacent block offset in a second direction, orthogonal to said first direction, from said attention-focused block and located outside said first area;

determining a first characteristic value on the basis of the image signal in said first area;

determining a second characteristic value on the basis of the image signal in said second area; and determining said threshold for binarizing said attention-focused pixel, said threshold determined by utilizing said first characteristic value and said second characteristic value.

16. A method of reading an image according to claim 4, wherein the characteristic value is at least one kind of value selected from a maximum value, a minimum value, and an intermediate value of the image signal.

17. A method of reading an image according to claim 4, wherein, in said adjacent-block defining step, a plurality of adjacent blocks each as a set of pixels are defined in a vicinity of said attention-focused block.

* * * * *